(12) United States Patent
Theuwis

(10) Patent No.: US 6,299,348 B1
(45) Date of Patent: Oct. 9, 2001

(54) IMMERSION MEASURING PROBE FOR MEASUREMENT IN LIQUIDS

(75) Inventor: Alfons Theuwis, Zonhoven (BE)

(73) Assignee: Hereaus Electro-Nite International N.V., Houthalen (BE)

( * ) Notice: Subject to any disclaimer, the term of this patent is extended or adjusted under 35 U.S.C. 154(b) by 0 days.

(21) Appl. No.: 09/427,959

(22) Filed: Oct. 27, 1999

(30) Foreign Application Priority Data

Oct. 27, 1998 (DE) .............................................. 198 49 433

(51) Int. Cl.[7] .............................. G01K 7/02; G01K 1/16; G01K 1/08
(52) U.S. Cl. .......................... 374/140; 374/179; 374/208; 266/87; 266/88; 136/226; 136/230; 136/232; 136/234
(58) Field of Search ..................................... 374/140, 139, 374/208, 183, 179, 163; 136/230, 232, 226, 234; 266/80, 88, 99, 225, 78, 87

(56) References Cited

U.S. PATENT DOCUMENTS

| | | |
|---|---|---|
| 3,505,871 | 4/1970 | Kern . |
| 3,716,417 * | 2/1973 | Evans ................................... 136/232 |
| 5,043,560 * | 8/1991 | Masreliez ............................. 219/497 |
| 5,168,764 | 12/1992 | Falk ................................... 73/864.59 |
| 5,584,578 | 12/1996 | Clauss, Jr. ............................. 374/140 |
| 5,999,081 * | 12/1999 | Hannigan et al. ..................... 338/28 |

FOREIGN PATENT DOCUMENTS

| | | |
|---|---|---|
| 0 375 109 A2 | 6/1990 | (EP) . |
| 1 095 106 | 12/1967 | (GB) . |
| 2 176611A | 12/1986 | (GB) . |

OTHER PUBLICATIONS

E. Halvachs, et al., Improvement of Turndown Performance Using Bomb Thermocouples at Granite City'BOF Shop, *Iron & Steelmaker*, Sep. 1993.

Drawing of Midwest Instrument Company, Inc. of "Internal Wound Bomb Layout", dated Jul. 18, 2000, allegedly depicting design of Minco bomb sold to LTV Steel on Jan. 24, 1997.

Drawing of Minkon Sampler Technik GmbH dated Dec. 18, 1997 of MINCO–Wurfsonde Type: BTT–18–75–26 (Article No. 132/0100), allegedly publicly used in Germany prior to Oct. 27, 1998.

* cited by examiner

*Primary Examiner*—Diego Gutierrez
*Assistant Examiner*—Gail Verbitsky
(74) *Attorney, Agent, or Firm*—Akin, Gump, Strauss, Hauer & Feld, L.L.P.

(57) ABSTRACT

An immersion measuring probe for measurement in liquids, in particular in molten metals, has a carrier tube, a measuring head mounted on one end of the carrier tube, and measuring elements as well as signal lines for the measuring signals generated by the measuring elements arranged on the measuring head. The signal lines are longer than the carrier tube and run from the end of the measuring head facing the inside of the carrier tube. In order to improve the handling of the immersion measuring probe, the signal lines are guided through the inside of the carrier tube and are wound up there around its longitudinal axis.

16 Claims, 2 Drawing Sheets

IMMERSION MEASURING PROBE FOR MEASUREMENT IN LIQUIDS

BACKGROUND OF THE INVENTION

The invention relates to an immersion measuring probe for measurement in liquids, in particular in molten metals, the probe having a carrier tube, a measuring head mounted on one end of the carrier tube, and measuring elements as well as signal lines for the measuring signals generated by the measuring elements arranged on the measuring head, wherein the signal lines are longer than the carrier tube and run from the end of the measuring head facing the inside of the carrier tube, and wherein the signal lines run through the inside of the carrier tube and are wound up inside of the carrier tube around its longitudinal axis.

Measuring probes of this type are known from U.S. Pat. No. 3,505,871. They are used for measuring in steel-converter furnaces (converters). For measurements in converters the measuring probe is dropped into the converter from a relatively large height. The signal lines are wound up on the inner surface of the carrier tube, and they automatically unwind themselves during the free fall of the measuring probes, wherein one end of the signal line is connected to the measuring head, while the other end of the signal line is either connected via a contact piece by extension lines or compensation lines or directly to a measuring and evaluation device. In this manner, several measuring probes can be stored in a magazine at a great height above the converter, wherein for the measurements one measuring probe at a time is released from the magazine and falls in free fall into the molten metal located in the converter.

Similar devices are known from U.S. Pat. No. 5,584,578, wherein the signal lines are wound up on the outer surface of the carrier tube.

Similar devices are also known from U.S. Pat. No. 5,168,764 or from I&AM, September 1993. The measuring probes disclosed by these sources are suspended in magazines, wherein it is known from U.S. Pat. No. 5,168,764 to wind the signal lines not directly around the carrier tube of the measuring probe, but instead to wind them in a separate container. This has the effect that in the magazines, along with the respective measuring probe, the supply container for the signal lines must also be mounted, so that the magazines must be designed to be suitably large.

From European published patent application EP 0 375 109 A2 a similar measuring probe is known. The measuring probe disclosed therein has a sample chamber arranged outside of the measuring head, which is mounted on a steel cable guided through a tube parallel to the carrier tube. The steel cable is wound up on a spool and can be unwound when the measuring head is lowered.

SUMMARY OF THE INVENTION

Starting from this known prior art, an object of the present invention is to create an improved measuring probe, which can be handled very simply and safely, and whose handling can be automated easily.

This object is achieved according to the invention in that the signal lines are wound in multiple layers against the inside wall of the carrier tube and that in the longitudinal direction of the carrier tube, directly in front of the winding of the signal lines, a fixing stopper with at least one passage for the signal lines is arranged to rest against the windings. Very long signal lines can thereby be housed in a very space-saving manner in a small space, so that an impairment of or damage to the windings is nearly ruled out, due to the protected position inside the carrier tube, so that a safe handling is ensured. Due to the stable outer surface, a plurality of measuring probes of this type can be arranged in stacked magazines in a space-saving manner. A suspended arrangement, wherein each one is spaced from the other, is not necessary. As soon as the probe is dropped from a magazine into the depth of the converter, the signal line unwinds itself from and out of the carrier tube due to its connection to a measurement or evaluation device. By the unwinding from the tube, expensive precautions to prevent rolling motions of the measuring head or the carrier tube on the way to the bottom are superfluous. A stable and space-saving mounting of the windings is thereby achieved.

Expediently, the signal lines are arranged in a signal cable, wherein a plurality of different signal lines are combined into a single strand. The signal lines can be connected by a contact piece at the end of the carrier tube facing away from the measuring head and/or can be constructed to run through this end of the carrier tube.

Advantageously, fixing stoppers are arranged in the longitudinal direction of the carrier tube directly in front of and behind the winding of the signal lines and lying against the windings, with respectively at least one passage for the signal lines. By these fixing stoppers the position of the windings is secured, so that they do not become disordered during transport or during handling, and thus do not impede the free fall of the measuring probe. The passages in the fixing stoppers make possible a free sliding through of the signal lines when the windings are unwound in free fall. Corresponding to the lengths of the signal lines, i.e. corresponding to the height of the total winding, the fixing stoppers can be arranged at different positions within the carrier tube.

Expediently, the measuring head is releasably mounted in the carrier tube, preferably with catch elements, so that after its release from the carrier tube the measuring head pulls the signal line behind it out of the carrier tube. For measurements in molten metals it has proven to be expedient that the catch elements release the measuring head upon a force of approximately 300N to 600N directed in the axial direction of the carrier tube. Furthermore, it is expedient that the catch elements of the measuring head engage on catch elements of a fixing stopper.

The measuring head can have at least one thermocouple and/or at least one electrochemical measuring element, especially for measuring oxygen, so that combined measurements of several parameters are possible.

In order to ensure an unhindered immersion and retention of the measuring head in the liquid, the measuring head preferably has a density greater than or equal to the predetermined density of the liquid to be measured.

The signal lines are generally approximately 10–50 times, in many cases especially 25–45 times, as long as the length of the measuring probe.

To protect the measuring elements during the handling of the measuring probe and during the immersion of the measuring head, the measuring head has a protective cap, which encloses at least the measuring elements, and which is formed from a material that dissolves or melts in the liquid.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
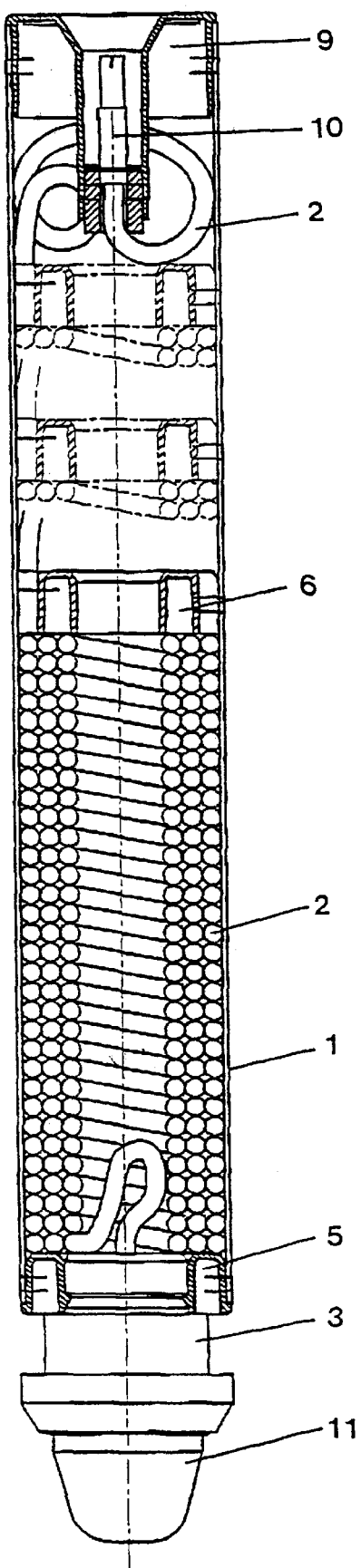
FIG. 1 shows an immersion measuring probe according to the invention with a sectioned carrier tube.

The immersion measuring probe has a carrier tube 1, which can be formed from cardboard, for example. Inside the carrier tube 1, starting from one end, a signal cable 2 is wound up, such that the outer layer of the winding lies against the inside surface of the carrier tube 1. In the signal cable 2 the signal lines not depicted individually in the drawing are combined. The signal lines arranged in the signal cable 2 are attached together with this at its one end to a measuring head 3. The measuring head 3 is mounted in one end of the carrier tube It is held there in a fixing stopper 5 by first catch elements 4 of the measuring head 3 and second catch elements 4' of the fixing stopper 5. The fixing stopper 5 in turn is affixed in the carrier tube 1. Directly lying against the fixing stopper 5, the winding of the signal cable 2 follows in the desired length, for example approximately 20–30 m. Connecting onto the windings, a second fixing stopper 6 is arranged, which together with the first fixing stopper 5 ensures that the windings are not damaged prior to the use of the immersion measuring probe according to specifications. Accordingly, the position of the second fixing stopper 6 within the carrier tube 1 is a function of the length of the signal cable 2. In FIG. 1 the position of the second fixing stopper 6 is depicted schematically for several different signal cable lengths. The windings are wound starting from the second fixing stopper 6 along the inner wall of the carrier tube 1 in the direction of the carrier tube front end, toward the measuring head 3. From there, a second winding is guided in the opposite direction to the second fixing stopper 6, and proceeding from there, a third winding is guided as an inner winding up to the first fixing stopper 5 arranged on the measuring head 3. From there, running in a curved manner, the signal cable 2 is connected to the contact points 7 of the measuring element inside the measuring head 3. This connection portion runs in the longitudinal axis of the carrier tube 1 through a corresponding axial opening 8 in the measuring head 3.

On the opposite end of the winding, the signal cable 2 is guided through an opening, adjacent to the inner wall of the carrier tube 1, of the second fixing stopper 6, in the direction of the second end of the carrier tube 1. This second end of the carrier tube 1 is closed by a stopper 9, in which a contact piece 10 is arranged. The contact piece 10 functions for the contact, not shown, of the signal lines arranged in the signal cable 2 with an extension cable or compensation cable to a measurement value display and evaluation unit.

Figure 2:
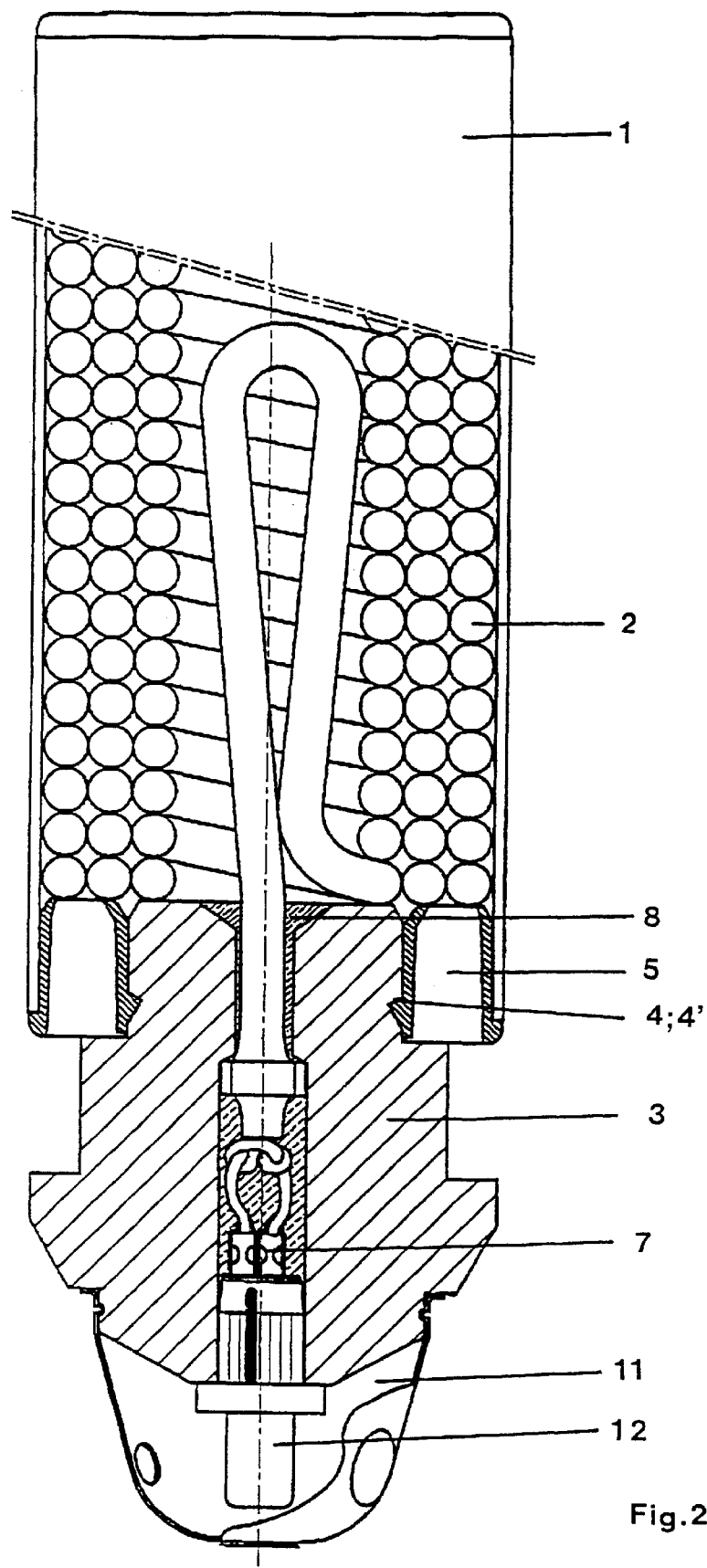
FIG. 2 shows a section through the front part of the immersion measuring probe according to FIG. 1.

In FIG. 2 the arrangement of the measuring head 3 in the carrier tube 1 is depicted in detail. The measuring head 3 carries an outer protective cap 11 for mechanical protection of the measuring elements, among other things upon impact of the measuring head 3 on the surface of the molten metal to be measured. In case of a measurement in steel melts, the protective cap 11 can likewise be constructed of steel. Inside this protective cap 11 attached on the outer side of the measuring head 3, an additional protective cap 12 is arranged directly around the measuring elements, and this cap also dissolves after passage of the measuring head 3 through a possible slag layer and opens the measuring elements, not shown in the drawing, to the action of the melt. The measuring elements themselves are constructed as conventional measuring elements well-known to the artisan, for example thermocouples or solid electrolyte oxygen measuring cells.

In operation, the immersion measuring probe is released from a magazine, for example a stacked magazine. It falls downwardly in free fall, whereby the signal cable 2 unwinds from the winding. By the attachment of the rear end of the immersion measuring probe to a measurement value display and evaluation device via the contact piece 10 and the stopper 9, the carrier tube can only fall a limited distance. The distance of the fall is a function of the length of the connection line to the measuring display and evaluation device. Upon reaching this maximum fall distance of the carrier tube 1, its movement suddenly stops, and a force acts on the measuring head 3, which pops it out of the first fixing stopper 5, so that it continues the falling movement, whereby it pulls the signal cable 2 behind it out of the winding.

The measuring head 3 is relatively compact and is constructed of solid steel up to the opening for receiving the signal cable 2 or the measuring elements and their connection to the signal cable 2. It therefore plunges deep into the molten mass upon impacting the melt surface, so that after the immersion of the measuring head 3 into the melt, measurements can be taken.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

What is claimed is:

1. An immersion measuring probe for measurement in liquids comprising a carrier tube, a measuring head mounted on one end of the carrier tube, and measuring elements and signal lines for measuring signals generated by the measuring elements arranged on the measuring head, the signal lines being longer than the carrier tube and running from an end of the measuring head facing inside the carrier tube, the signal lines running through the inside of the carrier tube (1) and being wound up inside the carrier tube (1) around its longitudinal axis, wherein the signal lines are wound in multiple layers against an inside wall of the carrier tube (1), and wherein in the longitudinal direction of the carrier tube (1) on its end facing the measuring head and directly in front of the winding of the signal lines there is a first fixing stopper (5) with at least one passage for the signal lines is arranged lying against the windings.

2. The immersion measuring probe according to claim 1, wherein the signal lines are arranged in a signal cable (2).

3. The immersion measuring probe according to claim 1, wherein the signal lines on the end of the carrier tube (1) facing away from the measuring head (3) are connected to a contact piece (9).

4. The immersion measuring probe according to claim 1, wherein in the longitudinal direction of the carrier tube (1) directly behind the winding of the signal lines there is a second fixing stopper (6) with at least one passage for the signal lines arranged lying against the windings.

5. The immersion measuring probe according to claim 1, wherein the measuring head (3) is releasably mounted in the carrier tube (1).

6. The immersion measuring probe according to claim 5, wherein the measuring head (3) is releasably mounted with first catch elements (4).

7. The immersion measuring probe according to claim 6, wherein the first catch elements (4) release the measuring head (3) under a force of approximately 300N to 600N directed in an axial direction.

8. The immersion measuring probe according to claim 6, wherein the first catch elements (4) on the measuring head (3) engage with second catch elements (4') on the first fixing stopper.

9. The immersion measuring probe according to claim 1, wherein the measuring elements comprise at least one of a thermocouple and an electrochemical measuring element arranged on the measuring head (3).

10. The immersion measuring probe according to claim 9, wherein the electrochemical measuring element is designed for measuring oxygen.

11. The immersion measuring probe according to claim 1, wherein the measuring head (3) has a density which is greater than or equal to a density of a liquid to be measured.

12. The immersion measuring probe according to claim 1, wherein a length of the signal lines is 10 to 50 times a length of the measuring probe.

13. The immersion measuring probe according to claim 12, wherein the length of the signal lines is 25 to 45 times the length of the measuring probe.

14. The immersion measuring probe according to claim 1, wherein the measuring head (3) has a protective cap (11), which encloses at least the measuring elements and comprises a material which melts or dissolves in the liquid.

15. The immersion measuring probe according to claim 1, wherein the signal lines on the end of the carrier tube facing away from the measuring head (3) are constructed running through the end.

16. The immersion measuring probe according to claim 1, wherein said liquids are molten metals.

* * * * *